US 6,741,699 B1

(12) United States Patent
Flockhart et al.

(10) Patent No.: US 6,741,699 B1
(45) Date of Patent: May 25, 2004

(54) ARRANGEMENT FOR CONTROLLING THE VOLUME AND TYPE OF CONTACTS IN AN INTERNET CALL CENTER

(75) Inventors: Andrew D. Flockhart, Thornton, CO (US); Eugene P. Mathews, Barrington, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 453 days.

(21) Appl. No.: 09/669,257

(22) Filed: Sep. 25, 2000

Related U.S. Application Data

(60) Provisional application No. 60/200,520, filed on Apr. 27, 2000.

(51) Int. Cl.⁷ .............................................. H04M 3/00
(52) U.S. Cl. .......................... 379/265.09; 379/88.13; 379/88.17; 379/265.02
(58) Field of Search .................... 379/88.13, 88.17, 379/265.02, 265.04, 265.09, 265.1, 265.11, 265.12, 265.13, 265.14, 266.02, 266.03, 266.06, 900

(56) References Cited

U.S. PATENT DOCUMENTS 5,155,761 A   10/1992 Hammond .................... 379/67
5,206,903 A   4/1993 Kohler et al. ............... 379/309

(List continued on next page.)

FOREIGN PATENT DOCUMENTS

| EP | 0 829 996 A2 | 3/1998 | ............ H04M/3/50 |
| EP | 0 866 407 A1 | 9/1998 | ............ G06F/17/30 |
| WO | WO 97/28635 | 8/1997 | ............ H04M/11/00 |

OTHER PUBLICATIONS

No Author, "When Talk Isn't Cheap" Sm@rt Reseller, v. 3, n. 13 (Apr. 3, 2000), p. 50.
No Author, "eGain's Commerce 2000 Platform Sets New Standard for eCommerce Customer Communications" Bussiness Wire (Nov. 15, 1999).

*Primary Examiner*—Bing Bui
(74) *Attorney, Agent, or Firm*—Sheridan Ross P.C.

(57) ABSTRACT

The present invention provides a method and system for controlling call volume into a call center. The method and system provides the contacting entity with a file of information for viewing that encourages or discourages continuance of the contact or initiation of another contact with the call center. This is accomplished by adding or omitting features from the file such as contact buttons or icons, messages, and the like. The architecture determines which type of file to provide a contacting entity based on such factors as the staffing level of the call center, the busyness of the call center, the value of the contact and/or contacting entity, and the like.

41 Claims, 5 Drawing Sheets

U.S. PATENT DOCUMENTS

| | | | |
|---|---|---|---|
| 5,506,898 A | 4/1996 | Costantini et al. | 379/266 |
| 5,592,378 A | 1/1997 | Cameron et al. | 395/227 |
| 5,594,726 A | 1/1997 | Thompson et al. | 370/485 |
| 5,606,361 A | 2/1997 | Davidsohn et al. | 348/14 |
| 5,627,884 A | 5/1997 | Williams et al. | 379/67 |
| 5,684,872 A | 11/1997 | Flockhart et al. | 379/266 |
| 5,724,092 A | 3/1998 | Davidsohn et al. | 348/14 |
| 5,740,238 A | 4/1998 | Flockhart et al. | 379/221 |
| 5,751,707 A | 5/1998 | Voit et al. | 370/384 |
| 5,754,639 A | 5/1998 | Flockhart et al. | 379/221 |
| 5,790,677 A | 8/1998 | Fox et al. | 380/24 |
| 5,828,747 A | 10/1998 | Fisher et al. | 379/309 |
| 5,839,117 A | 11/1998 | Cameron et al. | 705/27 |
| 5,875,437 A | 2/1999 | Atkins | 705/40 |
| 5,880,720 A | 3/1999 | Iwafune et al. | 345/327 |
| 5,884,032 A | 3/1999 | Bateman et al. | 395/200.34 |
| 5,897,622 A | 4/1999 | Blinn et al. | 705/26 |
| 5,903,877 A | 5/1999 | Berkowitz et al. | 705/26 |
| 5,905,793 A | 5/1999 | Flockhart et al. | 379/266 |
| 5,982,873 A | 11/1999 | Flockhart et al. | 379/266 |
| 6,000,832 A | 12/1999 | Franklin et al. | 364/479.02 |
| 6,044,205 A | 3/2000 | Reed et al. | 395/200.31 |
| 6,049,547 A | 4/2000 | Fisher et al. | 370/412 |
| 6,064,730 A | 5/2000 | Ginsberg | 379/265 |
| 6,064,731 A | 5/2000 | Flockhart et al. | 379/265 |
| 6,088,441 A | 7/2000 | Flockhart et al. | 379/265 |
| 6,163,607 A | 12/2000 | Bogart et al. | 379/266 |
| 6,173,053 B1 | 1/2001 | Bogart et al. | 379/266 |
| 6,192,122 B1 | 2/2001 | Flockhart et al. | 379/266 |
| 6,295,353 B1 | 9/2001 | Flockhart et al. | 379/265 |
| 6,366,668 B1 | 4/2002 | Borst et al. | 379/266.04 |
| 6,389,028 B1 | 5/2002 | Bondarenko et al. | 370/401 |
| 6,430,282 B1 | 8/2002 | Bannister et al. | 379/211.02 |
| 6,449,356 B1 | 9/2002 | Dezonno | 379/265.01 |
| 6,453,038 B1 | 9/2002 | McFarlane et al. | 379/265.05 |
| 6,463,346 B1 | 10/2002 | Flockhart et al. | 700/102 |
| 6,535,600 B1 | 3/2003 | Fisher et al. | 379/265.12 |
| 6,597,685 B2 | 7/2003 | Miloslavsky et al. | 370/352 |
| 2002/0118816 A1 | 8/2002 | Flockhart et al. | 379/265.12 |
| 2002/0181692 A1 | 12/2002 | Flockhart et al. | 379/265.02 |

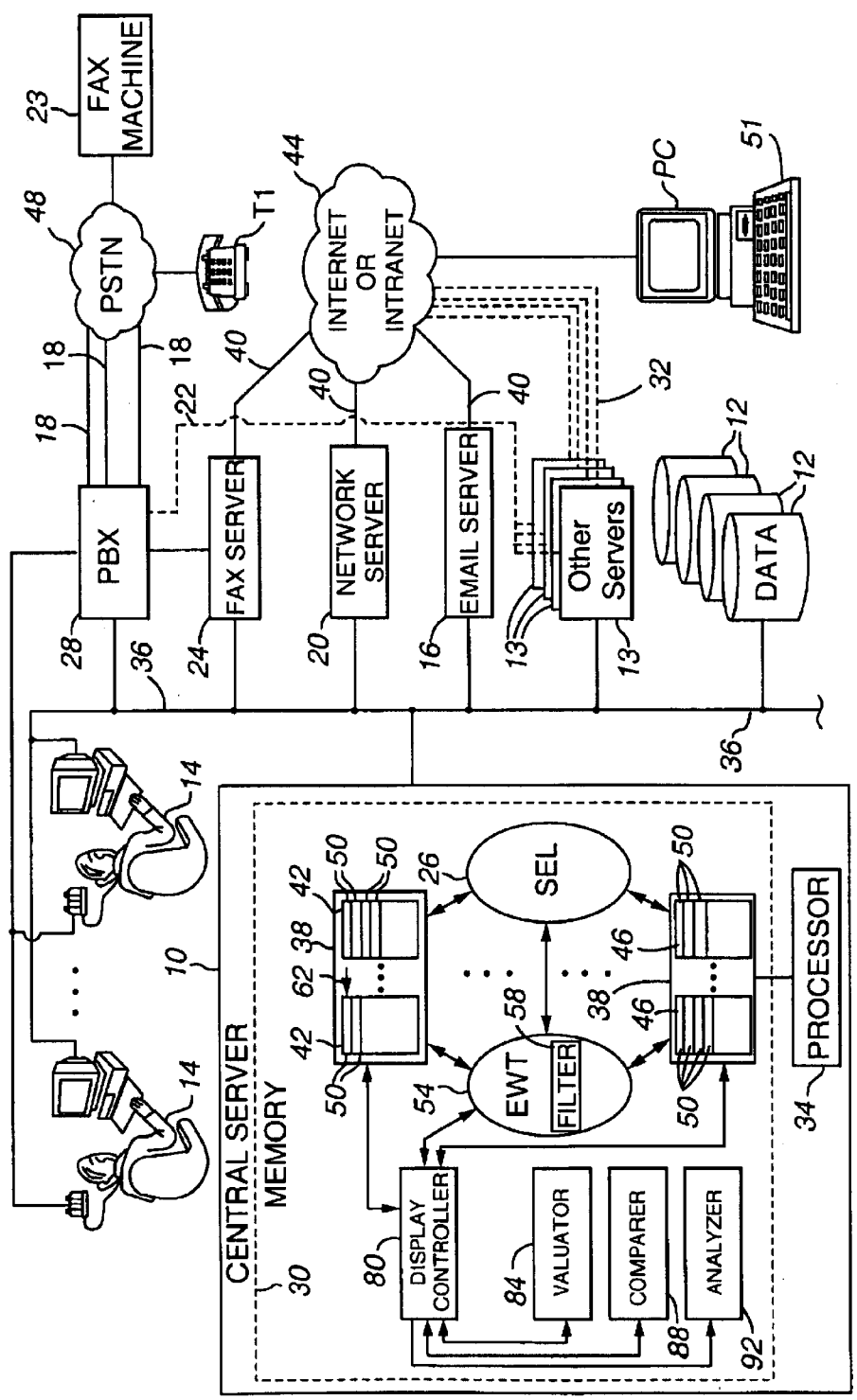

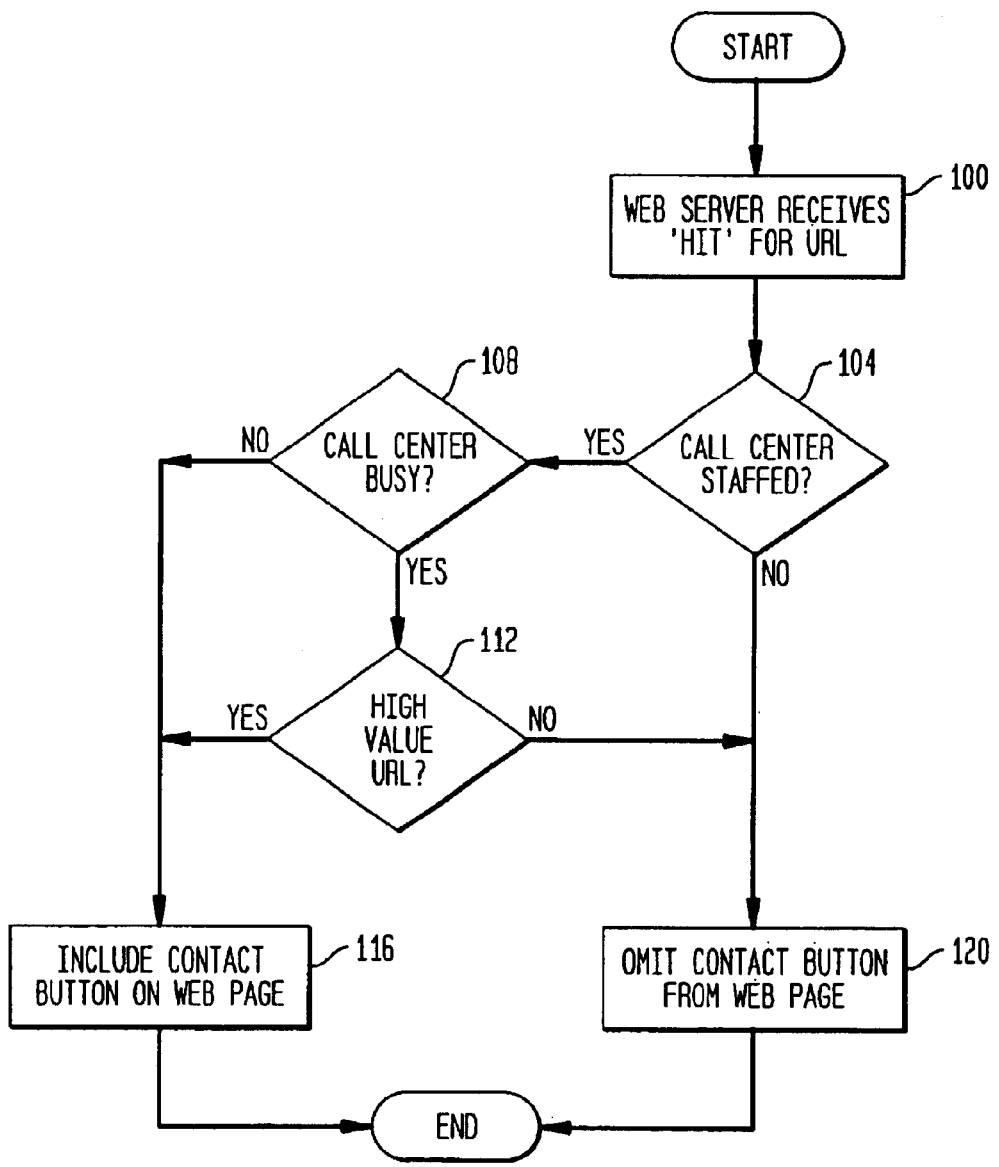

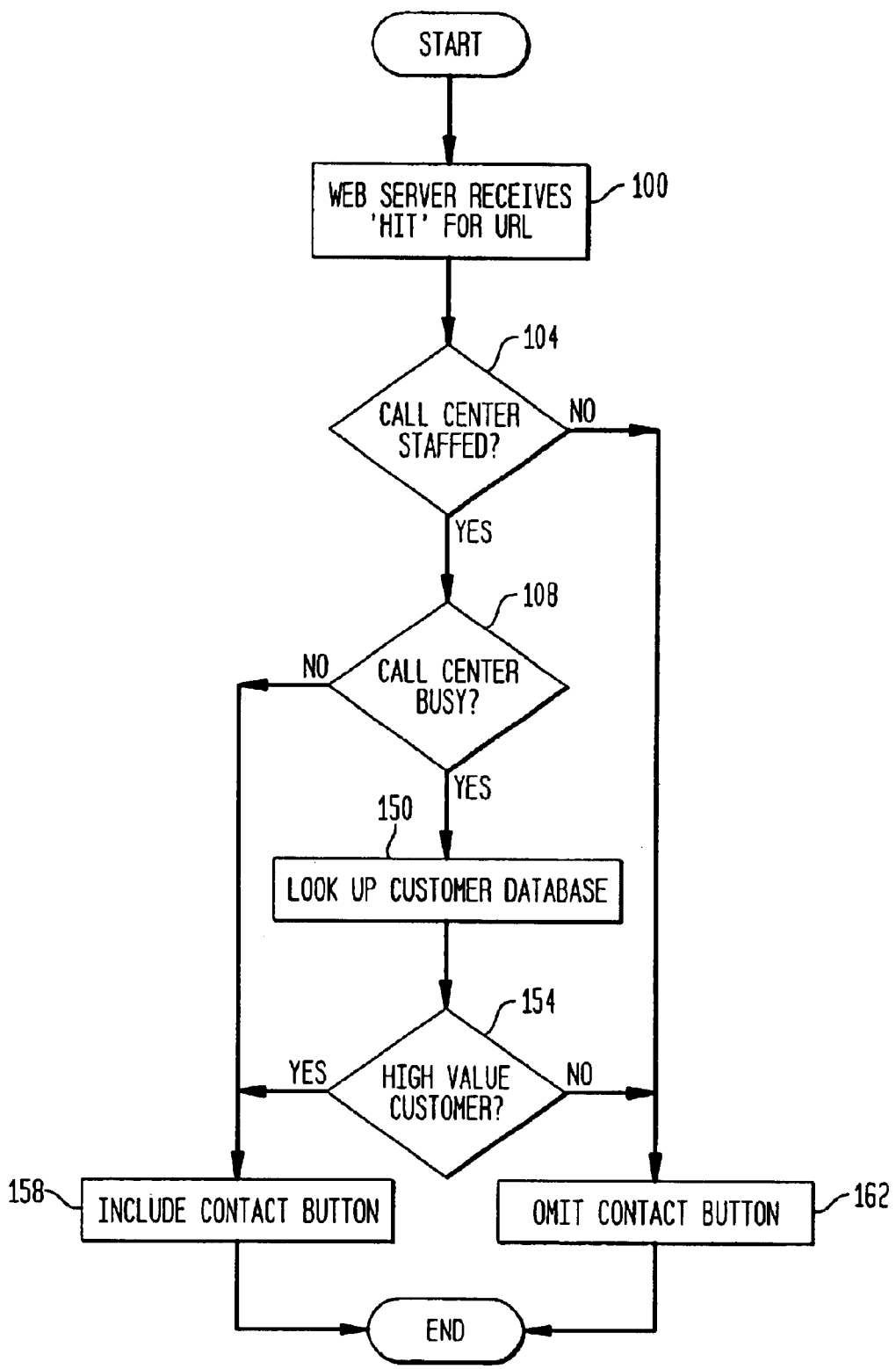

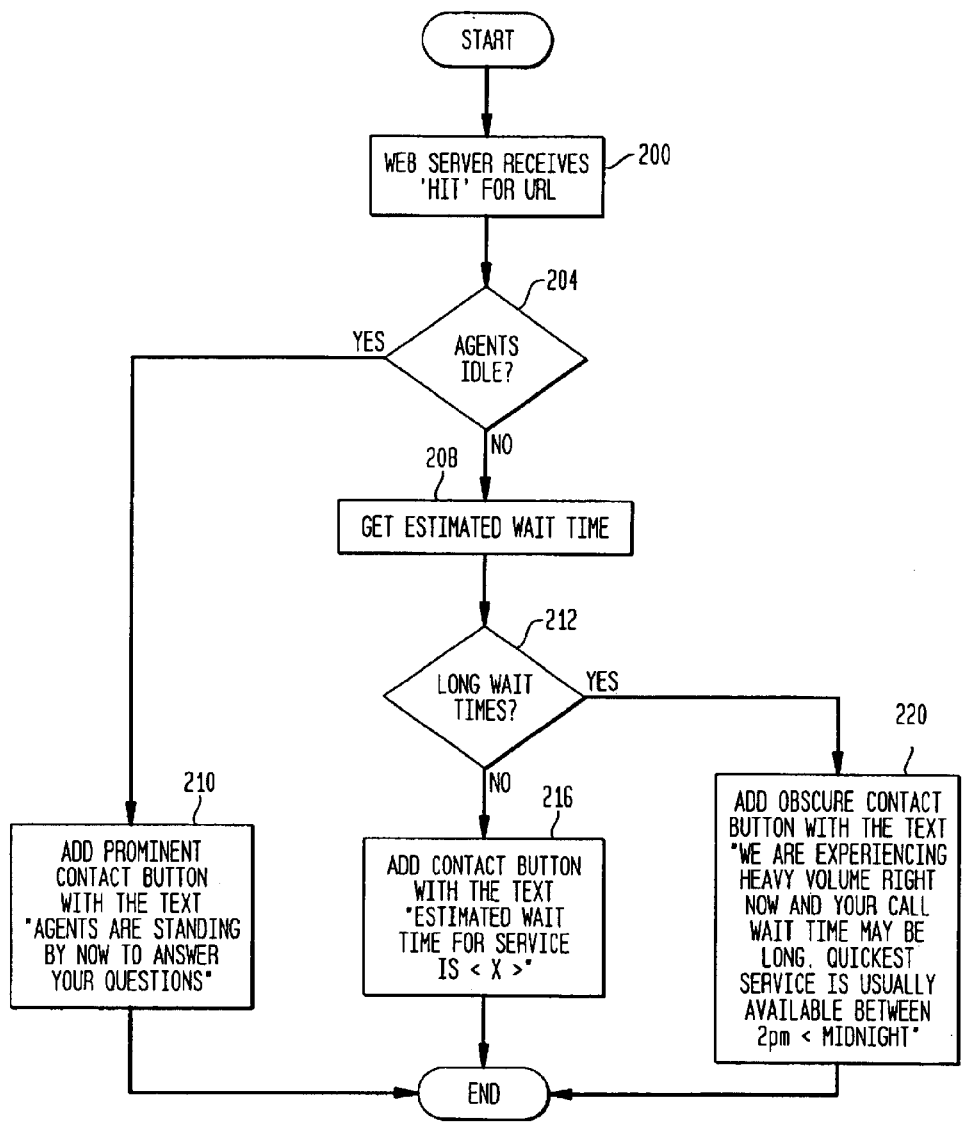

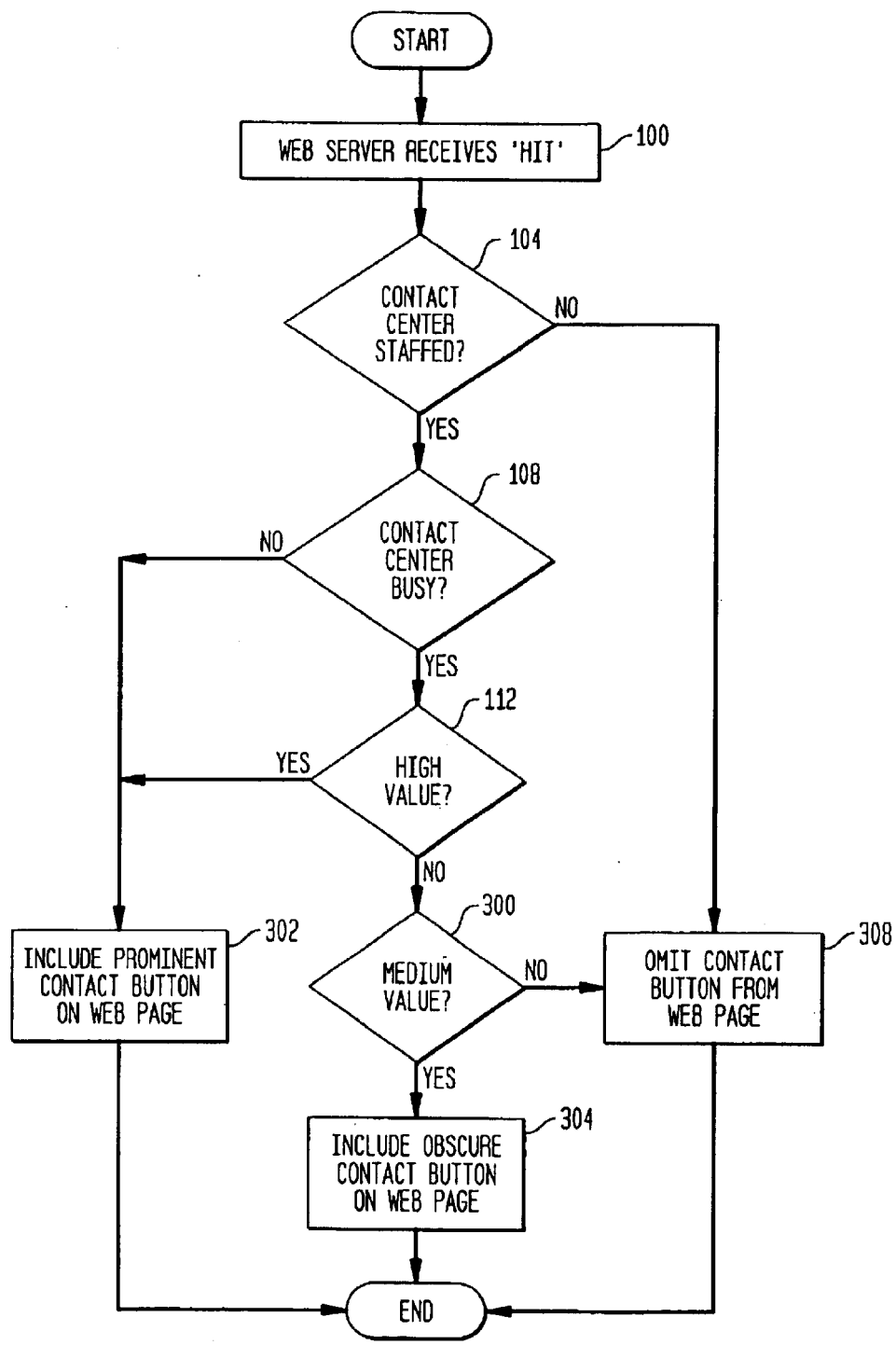

ARRANGEMENT FOR CONTROLLING THE VOLUME AND TYPE OF CONTACTS IN AN INTERNET CALL CENTER

CROSS REFERENCE TO RELATED APPLICATION

The present application is related to U.S. Provisional application Serial No. 60/200,520, filed Apr. 27, 2000, and entitled "WAIT TIME PREDICTION ARRANGEMENT FOR NON-REAL-TIME CUSTOMER CONTACTS", U.S. patent application Ser. No. 09/641,403, filed Aug. 17, 2000, and having the same title, and U.S. patent application Ser. No. 09/669,486, filed herewith and entitled "ROUTING BASED ON THE CONTENTS OF A SHOPPING CART", each of which is hereby incorporated by reference in its entirety.

FIELD OF THE INVENTION

The present invention relates generally to contact centers and specifically to controlling the volume and/or type of contacts in a networked call center.

BACKGROUND

In automatic call-distribution (ACD) systems, calls incoming to a call center are answered and handled by a plurality of agents. The ACD system automatically distributes and connects incoming calls to whatever agents are suited to handling the calls and are free, i.e., not handling other calls at the moment. As used herein, a "call" refers to any mode or type of contact between two entities, including without limitation voice calls, VoIP, text-chat, e-mail, fax, electronic documents, web forms, voice messages, and video calls, to name but a few.

Due to the random and peaked nature of inbound calls from customers, a call center frequently becomes overloaded when no suitable agents are available to handle calls when the calls come in. The calls are placed in different queues based upon some preestablished criteria and are placed in each queue in the order of their arrival and/or priority. Numerous techniques have been devised for determining an actual or anticipated wait time for each enqueued item, and the enqueued items are typically serviced based on the actual and/or anticipated wait time. Although this approach is effective in many applications, the approach is unable to control incoming call volume and therefore customers can still experience long wait times. Long wait times can lead to customer frustration and defection.

In another approach to managing call volume, access to the contact center is limited by denying access during busy periods when particular inbound call volume thresholds have been exceeded. Denying access to a caller after the caller has taken the trouble to phone the contact center can also lead to customer frustration and defection.

SUMMARY OF THE INVENTION

These and other needs are addressed by the method and architecture of the present invention. The invention is generally directed to a method for controlling call or contact volume in which a collection of information is provided for viewing by a contacting entity to influence the behavior of the contacting entity. The contacting entity will typically electronically contact the contact center such as via the Internet. The collection of information can be varied among contacting entities depending on the desirability of servicing each such contacting entity.

In one embodiment of the invention, a method for controlling a volume of contacts to be serviced by a contact center is provided that includes the steps of:

(a) analyzing one or more predetermined types of information associated with a contacting entity; and (b) creating or constructing or providing a collection of information (e.g., a web page, contact icon, live caller button, etc.) for viewing (e.g., on a computer monitor of the contacting entity via a web server and a web browser, etc.) by the contacting entity in response to the analyzing step. The collection of information is configured or designed to influence the behavior of the contacting entity. By influencing contacting entity behavior, the volume of incoming contacts with agents can be controlled dynamically. The ability to control inbound call or agent contact volume dynamically can render the contact center more efficient and profitable and easier to manage.

By way of example, a contacting entity typically initially contacts the contact center via a web server and a web browser, such as by browsing on the Internet. The contact center must then determine whether or not the contacting entity should be encouraged to or discouraged from directly contacting an agent of the contact center. Typically, the contact of the agent will be by means of a voice contact. In this manner, the volume of incoming (direct) contacts to agents is controlled dynamically.

In one configuration, the contact center provides the collection of information for viewing by the contacting entity by transmitting the information over a network. This configuration is particularly suited to the Internet and specifically to an Internet call center supporting an E-commerce web-site.

The predetermined types of information associated with each of the plurality of contacting entities can be any of a broad variety of information. In one configuration, the information includes at least one of (a) information provided by the contact center to the contacting entity in the transaction (e.g., a file or collection of information such as a web page or file address such as a web address, a universal or uniform resource locator (URL), etc.), (b) information provided by the contacting entity to the contact center in the transaction (e.g., an answer to a query such as a webform, a cookie, login and/or password information, the geographic location of the entity, the wealth of the entity, the type of contacting entity (business or individual), etc.), (c) information that is unique to the contacting entity that was not provided by the entity in the particular transaction (e.g., historic business volume for the entity (which is typically stored in the memory of the contact center), etc.), (d) a wait time (whether actual or predicted) associated with the contacting entity, and/or (e) a staffing level of the contact center and/or a skill level in the contact center.

The analyzing step can be performed in many different ways. In one configuration, the analyzing step is performed by comparing a value associated with the contact and/or the contacting entity to a predetermined value(s). In this manner, when there are too many inbound calls or agent contacts to the contact center the contact center agent's can preferentially service only those contacts constituting more profitable types of business.

The creating or constructing or providing step can be performed in many different ways depending upon the specific application. In one configuration, this step includes the substep of selecting at least one of the following features for the collection of information based on the analyzing step: icon type, icon size, icon color (which includes not only differing colors but also different shades of the same color), message type, message size, message color (which includes not only differing colors but also different shades of the same color). As will be appreciated, an "icon" is a picture on a display that represents a particular object (e.g., a phone), an operation (e.g., live caller or help button), and/or a group or ordering or collection of files. In another configuration, the creating or constructing or providing step includes at least one of omitting an icon from the collection of information and adding an icon to the collection of information. In another configuration, this step includes at least one of omitting a message from the collection of information and adding a message to the collection of information. In yet another configuration, when this step is performed for a first contacting entity an icon (and/or message) is omitted from a first collection of information (or first display) corresponding to the first contacting entity and when the step is performed for a second contacting entity the icon (and/or message) is included in a second collection of information (or second display) corresponding to the second contacting entity.

In another configuration, the method includes the additional steps of:
  determining a staffing level of the contact center or a skill in the contact center or a customer type serviced by the contact center; and
  determining if the contact center has at least one of an available working agent for a selected contact and/or a wait time in excess of a predetermined amount for the selected contact. In this configuration, the displayed collection of information is varied as set forth in the steps noted above when the contact center or a skill level or customer type is insufficiently staffed and/or the contact center is busy.

In another embodiment, a system for controlling a volume of contacts to be serviced by a contact center is provided that includes:
  (a) analyzing means (e.g., software) for analyzing one or more predetermined types of information associated with a contacting entity; and
  (b) providing means (e.g., software) for providing a collection of information for viewing by the contacting entity in response to input from the analyzing means.

In yet another embodiment, a system for controlling a volume of agent contacts to be serviced by a contact center is provided that includes a display controller for controlling a file of information viewed by an entity contacting the contact center. In response to a first signal from the display controller (or in a first mode), a first display (or first collection of information) is provided to a first contacting entity to encourage the first contacting entity to continue a first contact or initiate a new contact such as with an agent. In response to a second signal from the display controller (or in a second mode), a second display (or second collection of information) is provided to a second contacting entity to discourage the second contacting entity from continuing a second contact or initiating a new contact such as with an agent.

In one configuration, in the first mode the first display has a first appearance and in the second mode the second display has a second appearance. The first appearance differs from the second appearance in one or more of the following respects: the presence or absence of an icon, the presence or absence of a message, icon type, icon size, icon color, message type, message size, and message color.

The system can include one or more different components depending upon the application. By way of example, the system can include a valuator for assigning a value to a contact and/or a contacting entity; a comparer for comparing the value assigned to a contact and/or contacting entity with a predetermined value to provide the display controller with input regarding whether to transmit the first or second signal to a computational component; a wait time predictor to provide wait time information to the display controller; and/or a call center analyzer to determine a level of staffing of the contact center, of a customer type, and/or of a skill level in the contact center.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 1 is a block diagram of a contact center according to a first embodiment of the present invention;

FIG. 2 is a flow schematic of the first embodiment of the present invention;

FIG. 3 is a flow schematic of a second embodiment of the present invention;

FIG. 4 is a flow schematic of a third embodiment of the present invention; and

FIG. 5 is a flow schematic of a fourth embodiment of the present invention.

DETAILED DESCRIPTION

FIG. 1 shows an illustrative embodiment of the present invention. A contact center comprises a central server 10 (such as a modified version of the CRM Central 2000 Server™ of Lucent Technologies, Inc.), a set of data stores or databases 12 containing contact or customer related information and other information that can enhance the value and efficiency of the contact, and a plurality of servers, namely a fax server 24, a network server 20 (hereinafter referred to as web server 20), an email server 16, and other servers 13, a private branch exchange PBX 28 (or private automatic exchange PAX), a plurality of working agents 14 operating computer work stations, such as personal computers, and/or telephones or other type of voice communications equipment, all interconnected by a local area network LAN (or wide area network WAN) 36. The fax server 24, web server 20 and email server 16 are connected via communication connections 40 to an Internet and/or intranet 44. The other servers 13 can be connected via optional communication lines 22, 32 to the PBX 28 and/or Internet or intranet 44. As will appreciated, other servers 13 could include a scanner (which is normally not connected to the PBX 28 or Internet or intranet 44), interactive voice recognition IVR software, VoIP software, video call software, voice messaging software, an IP voice server, and the like. The PBX 28 is connected via a plurality of trunks 18 to the public switch telecommunication network PSTN 48 and to the fax server 24 and telephones of the agents 14. As will be appreciated, faxes can be received via the PSTN 48 or via the Internet or intranet 44 by means of a suitably equipped personal computer. The PBX 28, fax server 24, email server 16, web server 20, and database 12 are conventional.

In the architecture of FIG. 1 when the central server 10 forwards a voice contact to an agent, the central server 10 also forwards information from databases 12 to the agents computer work station for viewing (such as by a pop-up display) to permit the agent to better serve the customer.

As will be appreciated, the central server 10 is notified via LAN 36 of an incoming real-time or non-real-time contact by the telecommunications component (e.g., PBX 28, fax server 24, email server 16, web server 20, and/or other server 13) receiving the incoming contact. The incoming contact is held by the receiving telecommunications component until the central server 10 forwards instructions to the component to forward the contact to a specific station or agent 14. The server 10 distributes and connects these contacts to stations 14 of available agents based on a set of predetermined criteria. The agents 14 process the contacts sent to them by the central server 10.

The memory 30 includes a plurality of sets 38 of call queues 42 and 46. Each set 38 of call queues 42 and 46 conventionally serves and holds contacts for a different work type and/or for real- versus non-real-time contacts. In the depicted embodiment, queues 42 serve non-real-time contacts while queues 46 serve real-time contacts. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness. Within each set 38 of queues 42 and 46, each queue holds contacts of a different priority and/or different type (e.g., e-mail, fax, electronic or paper documents, webform submissions, voice messages, voice calls, VoIP calls, text chat, video calls, and the like). The priority of a contact is determined according to well known predefined criteria. A specific method for prioritizing contacts in a network is set forth in U.S. Patent Application "Routing Based on the Contents of a Shopping Cart", having Attorney File No. 4366-20, and filed concurrently herewith, which is incorporated herein by reference.

Each queue 42 and 46 normally functions as a first-in, first-out (FIFO) buffer memory, and includes a plurality of entries, or positions 50, each for identifying a corresponding one enqueued contact. The position 50 at the head of the queue is considered to be position 1, the next subsequent position 50 to be position number 2, and so forth.

Memory 30 further includes an estimated wait time (EWT) function, (or waiting time predictor) 54. As its name implies, this function determines an estimate of how long a contact that is placed in a queue 42 or 46 will have to wait before being delivered to an agent 14 for servicing. The estimate is derived separately by EWT function 54 for each queue 42 or 46 of each set 38.

For real-time contacts, the estimate is based on the average rate of advance of calls through positions 50 of the contacts' corresponding queue 46. An illustrative implementation of EWT function 54 for real-time contacts is disclosed by U.S. Pat. No. 5,506,898.

For non-real-time contacts, the estimate is determined differently than for real-time contacts. The technique(s) for estimating the EWT is set forth in copending U.S. Provisional Application entitled "WAIT TIME PREDICTION ARRANGEMENT FOR NON-REAL-TIME CUSTOMER CONTACTS" having Ser. No. 60/200,520 and a filing date of Apr. 27, 2000 and in copending U.S. patent application having Attorney File No. 4366-19, filed concurrently herewith and having the same title, and which are incorporated herein by this reference. The system records the time at which each item is serviced from its respective queue. The advance time is then calculated by measuring the time interval between the time of servicing of a first item in the first position 50 at the head of the queue and the time of servicing of a second, later item in the second position. Stated another way, the advance time is determined by the following equation:

Advance Time=(the time of servicing of the second item)−(the time of servicing of the first item).

The weighted average advance time WAT can then be determined using the advance time, the Estimated Wait Time EWT using the WAT.

To guard against substantial fluctuations in the advance time from certain types of events, a filter 58 is provided. The processor 34 sets an indicator 62 when a predetermined type of event occurs and the filter 58 discards the advance time associated with the marked item. Predetermined types of events are as follows:

(a) The respective queue has no working agents available for servicing items from the queue. This event occurs, for example, after normal working hours when the contact center is unstaffed. Non-real-time contacts will remain in the queue during the unstaffed period.

(b) The respective queue is empty. This event occurs, for example, during quiet periods in which there are no items in the queue.

(c) The system clock is changed. This event occurs, for example, when the system clock is changed to or from daylight savings time. Non-real-time contacts may remain in the queue during the clock change.

(d) The system is nonoperational. This event occurs, for example, when the system is down for a time and then rebooted. Non-real-time contacts may persist in the queue during the period the system is shut down.

(e) The agent defers the servicing of an enqueued item.

Memory 30 can further include a contact-selection (SEL) function 26. Function 26 is conventional in that, for each contact at the head of a queue, it determines, for real-time a current or oldest wait time or CWT, the weighted average advance time WAT, the expected wait time EWT, and/or the predicted wait time PWT (which is the sum of the CWT and WAT), and, for each available agent, it selects a contact from queues 42 and/or 46 for connection to and handling by that agent. This feature is further described in U.S. Pat. No. 5,905,793, which is incorporated herein by this reference.

In FIG. 1, the center 10 is shown as being connected to a plurality of interfaces 51 (e.g., graphical user interfaces, etc.) via communication lines 40. As will be appreciated, communication lines 40 can alternatively conduct voice energy from a contacting entity.

The center 10 can be connected to (or include) the web server 20 to provide collections (or files) of information stored in the memory (not shown) of the web server 20 for viewing by a contacting entity via trunks 40 and interfaces 51. As will be appreciated, the files of information, such as web pages, can include features such as contact icons or informational messages to facilitate service of the contacting entity by the contact center 10, information regarding merchandise and/or services for sale to the contacting entity.

Alternatively, the display controller, evaluator, comparer and analyzer could be located in the web server. The web server queries the central server and/or data 12 as necessary before deciding on the final format of the web page (e.g. contact icon) to be displayed on PC51. In any event, the decision process is an initiated by the web server 20.

To control the volume of incoming calls or contacts dynamically, the memory can include a display controller 80 in communication with a valuator 84, a comparer 88, and an analyzer 92. The display controller 80 forwards a signal to a computational component connected to (or included in) the contact center 10 (e.g., the web server 20) to provide a predetermined or selected file of information to an interface 51 for viewing by an entity accessing the interface 51. These files of information are contained in the memory of the web server 20 and, as noted, are designed to encourage or discourage the corresponding entity to continue or from continuing the contact or to initiate or from initiating a new contact (e.g., to contact or not to contact the Internet call center). As will be appreciated, this can be accomplished by numerous techniques including those described above (e.g., including or excluding a contact icon, including or excluding a message, etc.). The valuator 84 assigns a value to a contacting entity based on one or more of the criteria described above. The comparer 88 compares the value assigned to each contacting entity by the valuator 84 with a predetermined value to provide the display controller 80 with input regarding whether to forward a signal to the computational component (or web server 20) to forward a file of information to the entity via a web browser (not shown) either encouraging or discouraging the continuance of the contact. The analyzer 92 collects information about the contact center 10, such as whether the contact center 10 is staffed (or operational), whether a particular skill level in the contact center 10 is staffed (or available), and/or whether a particular customer type is staffed (or available).

The operation of the display controller will now be described with reference to FIGS. 1 and 2. In box 100, the web server 20 connected to communication lines 40 receives a "hit" (from a web browser) for a web address (such as a URL) serviced by the web server 20. In response, the analyzer 92 determines in decision diamond 104 if the contact center 10 is staffed. In one configuration, the analyzer 92 determines whether the center 10 itself is staffed and/or to what level, whether a particular skill or skill level serviced by the center 10 is staffed and/or to what level, and whether a particular customer type serviced by the center 10 is staffed and/or to what level.

If the center 10 is staffed, the analyzer 92 next determines in decision diamond 108 whether the contact center 10 is busy. In one configuration, this step is performed by determining whether the center 10 has an available agent, whether a particular skill level or customer type has an available agent, and/or whether the actual or estimated wait time of the EWT 54 exceeds a predetermined amount for a queue containing the subject contact.

If the center 10 is busy, the comparer 88 in decision diamond 112 determines whether the contact corresponding to the hit is a high value web address. This is done in one configuration by comparing a value assigned (by the valuator) to the web address associated with the contact to a predetermined threshold value. If the assigned value equals or exceeds the threshold value, the contact is deemed to have a high value (or is more desirable for servicing). If the assigned value is less than the threshold value, the contact is deemed to have a low value (or is less desirable for servicing).

If the call center is not busy (decision diamond 108) or the contact has a high value (decision diamond 112), the display controller 80 in box 116 sends a signal to the web server 20 to select and forward to the interface 51 of the particular contacting entity a file of information including a contact button or icon in a display of the interface for direct contact with an agent of the appropriate skills.

If the call center is not staffed (decision diamond 104) or if the contact has a low value (decision diamond 112), the display controller 80 in box 120 sends a signal to the web server 20 to select and forward to the interface 51 of the particular contacting entity a file of information excluding a contact button or icon in a display of the interface.

This configuration uses inclusion or omission of the contact button or icon from the display to ensure that the contacts that are serviced during peak or high contact level periods are the most profitable types of business.

Yet another operational configuration is depicted in FIG. 3. After box 100 and decision diamonds 104 and 108, the valuator 84 in box 150 accesses a customer database (not shown) in the memory 30 to obtain specific information about the customer. Examples of such information would include the types of customer-specific information described above. In one configuration, this information was previously assigned to the contacting entity by the valuator 84. In another configuration, the valuator 84 uses this information to assign a value to the contacting entity. The comparer in decision diamond 154 determines whether the contacting entity has a high or low value. This is done by comparing the assigned value corresponding to the contacting entity against a threshold value. If the assigned value equals or exceeds the threshold value, the contacting entity has a high value. If not, the contacting entity has a low value. In the event that the call center is not busy (decision diamond 108) or the contacting entity has a high value (decision diamond 154), the display controller 80 in box 158 forwards a signal to the web server 20 to select and provide a file of information to the contacting entity via the interface 51 that includes a contact button or icon for direct contact with an agent of the appropriate skills. In the event that the call center is busy (decision diamond 108) or the contacting entity has a low value (decision diamond 154), the display controller 80 in box 162 forwards a signal to the web server 20 to select and provide a file of information to the contacting entity via the interface 51 that omits or excludes a contact button or icon.

A further operational configuration is depicted in FIG. 4. In this configuration, the contact center 10 seeks to generate a flow of contacts which is consistent in volume to the contact center's ability to process such contacts. When the web server 20 in box 200 receives a "hit" on a web address serviced by the web server, the analyzer 92 determines whether any working agents 14 are idle (or available). If so, the display controller 80 in box 210 forwards a file of information to the interface 51 corresponding to the "hit" that includes a prominent contact button or icon and a message "Agents are standing by now to answer your questions." If not, the analyzer 92 in box 208 next obtains from EWT 54 an estimated or predicted wait time for the contact corresponding to the "hit". In decision diamond 212, the analyzer 92 determines if the estimated wait time exceeds a threshold level (or is a long wait time). If the wait time is not long, the display controller 80 in box 216 forwards a file of information to the interface 51 corresponding to the "hit" that includes a contact button or icon and a message "The estimated wait time for service is X", where X is the estimated wait time from the EWT 54. If the wait time is long, the display controller 80 in box 220 forwards a file of information to the interface 51 corresponding to the "hit" that includes an obscure contact button or icon and a message "We are experiencing heavy volume right now and your wait time may be long. The quickest service is usually available between 2 pm and midnight." The underlined language may differ depending upon the application. As will be appreciated, contact centers typically have different time periods when they experience heavy call volume.

Because the value of the contact and/or contacting entity is not considered, the valuator 84 and comparer 88 are typically not present in an architecture performing the steps of FIG. 4. As will be appreciated, this configuration could be modified to perform a valuation step and comparison step as described above with reference to FIGS. 2 and 3. In this way, the value of the contact or contacting entity would be an additional factor in determining which of the boxes 210, 216, and 220 is performed for a particular contacting entity.

A further operational configuration is depicted in FIG. 5. In this configuration, the display controller has multiple value levels with associated files of information for viewing by the contacting entity. Box 100 and decision diamonds 104, 108 and 112 were described above with reference to FIG. 2. If the contact and/or contacting entity has a high value, the display controller 80 in box 302 sends a message to the web server 20 to provide the contacting entity with a file of information in which the contact button is present and prominent. If the contact and/or contacting entity does not have a high value, the comparer 88 next determines in decision diamond 300 whether the contact and/or contacting entity has a medium value. The comparer determines this by comparing the assigned value to a second, lower threshold value. If the assigned value equals or exceeds the second, lower threshold, the display controller in box 304 sends a message to the web server to provide the contacting entity with a file of information in which the contact button is present but obscure. If the assigned value is less than the second, lower threshold, the display controller in box 308 sends a message to the web server to provide the contacting entity with a file of information in which the contact button is omitted.

A number of variations and modifications of the invention can be used. It would be possible to provide for some features of the invention without providing others. For example voice messages could be used in the method of FIG. 4 rather than displayed text messages to control call volume. This alternative embodiment would apply to non-Internet applications. The information forwarded to interface 51 could be stored in memory 30 and downloaded to web server 20. The contact center of FIG. 1 could be the subscriber—premises equipment disclosed in U.S. Pat. Nos. 5,905,793; 5,506,898; and 5,206,903, all of which are incorporated herein by this reference.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for controlling a volume of contacts to be serviced by a contact center, comprising:

providing a plurality of sets of display information corresponding to a plurality of different displays, each of the displays corresponding to a degree of desirability in continuing the contact with a contacting entity;

analyzing one or more predetermined types of information associated with a contacting entity to determine the desirability of continuing the contact with the contacting entity;

selecting a set of display information from among the plurality of sets of display information corresponding to the desirability of continuing the contact with the contacting entity, wherein a first set of display information encourages the contacting entity to continue the contact and wherein a different second set of display information discourages the contacting entity from continuing the contact; and forwarding the selected set of display information to the contacting entity.

2. The method of claim 1, wherein the one or more predetermined types of information is related to a plurality of a value associated with the contacting entity, a value associated with the contact by the contacting entity, and an ability of the contact center to service the contact by the contacting entity.

3. The method of claim 1, wherein the one or more predetermined types of information associated with the at least one of the one or more contacting entities includes at least one of (a) information provided by the contact center to the contacting entity in the transaction, (b) information provided by the contacting entity to the contact center in the transaction, (c) information that is unique to the contacting entity, (d) a wait time associated with the contacting entity, and (e) at least one of a staffing level of the contact center, a skill of the contact center, and a customer type of the contact center.

4. The method of claim 3, wherein the information that is unique to the contacting entity includes a plurality of an identifier of the contacting entity, a location of the contacting entity, prior business patterns of the contacting entity, financial resources of the contacting entity, and a type of contacting entity.

5. The method of claim 3, wherein the information that is unique to the contacting entity is obtained from a webform, a log in process, a cookie, and a file containing information from historic transactions.

6. The method of claim 1, wherein the plurality of displays differ in one or more of icon type, icon size, icon color, message type, message size, and message color.

7. The method of claim 1, wherein the analyzing step comprises:

determining a staffing level of at least one of the contact center, a skill in the contact center and a customer type of the contact center; and determining if the contact center has at least one of an available working agent for a selected contact and a wait time in excess of a predetermined amount for the selected contact to determine the desirability of continuing the contact with the contacting entity.

8. The method of claim 1, wherein the analyzing step includes the step of comparing a value associated with at least one of a contact and a contacting entity to one or more predetermined values to determine the desirability of continuing the contact with the contacting entity and wherein only one of the first and second displays comprises an icon to contact an agent.

9. The method of claim 1, wherein the selecting step includes the step of selecting at least one of the following features for the display information based on the analyzing step: icon type, icon size, icon color, message type, message size, and message color.

10. The method of claim 1, wherein the selecting step includes at least one of omitting an icon from the display information and adding an icon to the display information and wherein the icon causes an agent to contact the contacting entity.

11. The method of claim 1, wherein the selecting step includes at least one of omitting a message from the display information and adding a message to the display information and wherein the message provides the estimated wait time until an agent can service the contact.

12. The method of claim 1, wherein when the selecting step is performed for a first contacting entity an icon is omitted from first display information corresponding to the first contacting entity and when the selecting step is performed for a second contacting entity the icon is included in second display information corresponding to the second contacting entity.

13. The method of claim 1, further comprising:
determining when a predetermined event has occurred;
when the predetermined event has occurred, performing the analyzing and selecting steps; and
when the predetermined event has not occurred, not performing the analyzing and selecting steps.

14. The method of claim 13, wherein the predetermined event is at least one of estimated wait time exceeds a selected threshold, agent staffing levels in one or more skills are below a selected threshold, the actual wait time exceeds a selected threshold, and agent staffing levels for one or more customer types are below a selected threshold.

15. The method of claim 13, wherein only one of the first and second displays is forwarded to a contacting entity when the predetermined event has not occurred.

16. A system for controlling a volume of contacts to be serviced by a contact center, comprising:
a comparer operable to analyze one or more predetermined types of information associated with a contacting entity to determine a desirability of servicing the contacting entity; and
a display controller operable to control, based on the desirability, a collection of information to be displayed to a first entity contacting the contact center, wherein, in a first mode of the display controller, a first collection of information is provided to encourage the first contacting entity to continue a first contact and in a second mode of the display controller a second collection of information is provided to discourage a second contacting entity from continuing a second contact, wherein the first and second collections of information are different.

17. The system of claim 16, wherein in the first mode a first display corresponding to the first collection of information has a first appearance and in the second mode a second display corresponding to the second collection of information has a second appearance and wherein the first appearance differs from the second appearance in one or more of the following respects: the presence or absence of an icon, the presence or absence of a message, icon type, icon size, icon color, message type, message size, and message color.

18. The system of claim 16, further comprising a valuator for assigning a value to at least one of a contact and a contacting entity.

19. The system of claim 18, wherein the comparer is operable to compare the value assigned to the at least one of a contact and contacting entity with one or more predetermined values to provide the display controller with input regarding whether to enter into first or second modes.

20. The system of claim 18, wherein the one or more predetermined types of information is at least one of information received from the entity during the contact and information previously assigned to the entity.

21. The system of claim 16, further comprising a wait time predictor to provide wait time information to the display controller.

22. The system of claim 16, wherein an interface accessed by the contacting entity is in communication with the display controller via a network.

23. The system of claim 16, further comprising a call center analyzer to determine at least one of a staffing level of the contact center, of a customer type and of a staffing level of a skill level of the contact center.

24. A system for controlling a volume of contacts to be serviced by a contact center, comprising:
a display controller for controlling a collection of information to be viewed by an entity contacting the contact center, wherein, in a first mode of the display controller, a first collection of information is provided to encourage a first contacting entity to continue a first contact and in a second mode of the display controller a second collection of information is provided to discourage the first contacting entity from continuing the first contact;
a valuator for assigning a value to at least one of the first contact and the first contacting entity; and
a comparer for comparing the value assigned to the at least one of the first contact and the first contacting entity with one or more predetermined values to provide the display controller with input regarding whether to enter into first or second modes.

25. The system of claim 24, wherein the first and second collections of information corresponding to different degrees of desirability in servicing the first contacting entity.

26. The system of claim 24, wherein the value is related to a plurality of a value associated with the contacting entity, a value associated with the contact by the contacting entity, and an ability of the contact center to service the contact by the contacting entity.

27. The system of claim 24, wherein the valuator assigns the value based on one or more predetermined types of information associated with the at least one of the one or more contacting entities includes at least one of (a) information provided by the contact center to the contacting entity in the transaction, (b) information provided by the contacting entity to the contact center in the transaction, (c) information that is unique to the contacting entity, (d) a wait time associated with the contacting entity, and (e) at least one of a staffing level of the contact center, a skill of the contact center, and a customer type of the contact center.

28. The system of claim 27, wherein the information that is unique to the contacting entity includes a plurality of an identifier of the contacting entity, a location of the contacting entity, prior business patterns of the contacting entity, financial resources of the contacting entity, and a type of contacting entity.

29. The system of claim 27, wherein the information that is unique to the contacting entity is obtained from a webform, a log in process, a cookie, and a file containing information from historic transactions.

30. The system of claim 24, wherein the first and second collections of information correspond to first and second different displays, the first and second displays differing in one or more of icon type, icon size, icon color, message type, message size, and message color.

31. The system of claim 24, wherein the valuator is operable to:

determine a staffing level of at least one of the contact center, a skill in the contact center and a customer type of the contact center; and determine if the contact center has at least one of an available working agent for a selected contact and a wait time in excess of a predetermined amount for the selected contact to determine the desirability of servicing the contacting entity.

32. The system of claim 24, wherein the display controller is operable to select at least one of the following features for the first and second collections of information: icon type, icon size, icon color, message type, message size, and message color.

33. The system of claim 24, wherein, when compared to the first collection of information, the second collection of information at least one of omits an icon from the display information and adds an icon to the display information and wherein the icon causes an agent to contact the contacting entity.

34. The system of claim 24, wherein, when compared to the first collection of information, the second collection of information at least one of omits a message from the display information and adds a message to the display information.

35. The system of claim 24, wherein the value is related to a value of a Universal Resource Locator associated with the contact center.

36. A method for controlling a volume of contacts to be serviced by a contact center, comprising:

providing a plurality of sets of display information corresponding to a plurality of different displays, each of the displays corresponding to a degree of desirability in continuing the contact with a contacting entity;

analyzing one or more predetermined types of information associated with a contacting entity to determine the desirability of continuing the contact with the contacting entity;

selecting a set of display information corresponding to the desirability of continuing the contact with the contacting entity; and forwarding the selected display information to the contacting entity, whereby the selected display information is configured to influence the interaction of the contacting entity with the contact center, wherein the analyzing step includes the step of comparing a value associated with at least one of a contact and a contacting entity to one or more predetermined values to determine the desirability of continuing the contact with the contacting entity and wherein only one of the first and second displays comprises an icon to contact an agent.

37. A method for controlling a volume of contacts to be serviced by a contact center, comprising:

providing a plurality of sets of display information corresponding to a plurality of different displays, each of the displays corresponding to a degree of desirability in continuing the contact with a contacting entity;

analyzing one or more predetermined types of information associated with a contacting entity to determine the desirability of continuing the contact with the contacting entity;

selecting a set of display information corresponding to the desirability of continuing the contact with the contacting entity; and forwarding the selected display information to the contacting entity, whereby the selected display information is configured to influence the interaction of the contacting entity with the contact center, wherein the analyzing step includes the step of comparing a value associated with at least one of a contact and a contacting entity to one or more predetermined values to determine the desirability of continuing the contact with the contacting entity and wherein only one of the first and second displays comprises an icon to contact an agent.

38. A method for controlling a volume of contacts to be serviced by a contact center, comprising:

providing a plurality of sets of display information corresponding to a plurality of different displays, each of the displays corresponding to a degree of desirability in continuing the contact with a contacting entity;

analyzing one or more predetermined types of information associated with a contacting entity to determine the desirability of continuing the contact with the contacting entity;

selecting a set of display information corresponding to the desirability of continuing the contact with the contacting entity; and forwarding the selected display information to the contacting entity, whereby the selected display information is configured to influence the interaction of the contacting entity with the contact center, wherein the selecting step includes at least one of omitting an icon from the display information and adding an icon to the display information and wherein the icon causes an agent to contact the contacting entity.

39. A method for controlling a volume of contacts to be serviced by a contact center, comprising:

providing a plurality of sets of display information corresponding to a plurality of different displays, each of the displays corresponding to a degree of desirability in continuing the contact with a contacting entity;

analyzing one or more predetermined types of information associated with a contacting entity to determine the desirability of continuing the contact with the contacting entity;

selecting a set of display information corresponding to the desirability of continuing the contact with the contacting entity; and forwarding the selected display information to the contacting entity, whereby the selected display information is configured to influence the interaction of the contacting entity with the contact center, wherein the selecting step includes at least one of omitting a message from the display information and adding a message to the display information and wherein the message provides the estimated wait time until an agent can service the contact.

40. A method for controlling a volume of contacts to be serviced by a contact center, comprising:

providing a plurality of sets of display information corresponding to a plurality of different displays, each of the displays corresponding to a degree of desirability in continuing the contact with a contacting entity;

analyzing one or more predetermined types of information associated with a contacting entity to determine the desirability of continuing the contact with the contacting entity;

selecting a set of display information corresponding to the desirability of continuing the contact with the contacting entity; and forwarding the selected display information to the contacting entity, whereby the selected display information is configured to influence the interaction of the contacting entity with the contact center, wherein when the selecting step is performed for a first contacting entity an icon is omitted from first display information corresponding to the first contacting entity and when the selecting step is performed for a second contacting entity the icon is included in second display information corresponding to the second contacting entity.

41. A method for controlling a volume of contacts to be serviced by a contact center, comprising:

(a) providing a plurality of sets of display information corresponding to a plurality of different displays, each of the displays corresponding to a degree of desirability in continuing the contact with a contacting entity;

(b) determining when a predetermined event has occurred;

(c) when the predetermined event has occurred, performing the following steps:

(i) analyzing one or more predetermined types of information associated with a contacting entity to determine the desirability of continuing the contact with the contacting entity;

(ii) selecting a set of display information corresponding to the desirability of continuing the contact with the contacting entity; and (iii) forwarding the selected display information to the contacting entity, whereby the selected display information is configured to influence the interaction of the contacting entity with the contact center; and (d) when the predetermined event has not occurred, not performing the analyzing and selecting steps (i) and (ii), wherein the predetermined event is at least one of estimated wait time exceeds a selected threshold, agent staffing levels in one or more skills are below a selected threshold, the actual wait time exceeds a selected threshold, and agent staffing levels for one or more customer types are below a selected threshold.

* * * * *